(12) United States Patent
Sasahara et al.

(10) Patent No.: US 8,908,805 B2
(45) Date of Patent: Dec. 9, 2014

(54) SIGNAL RECEIVING METHOD AND RECEIVER WITH ERROR DETECTION AND CORRECTION

(71) Applicant: Seiko Epson Corporation, Tokyo (JP)

(72) Inventors: Hideo Sasahara, Matsumoto (JP); Akira Kimura, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 82 days.

(21) Appl. No.: 13/691,582

(22) Filed: Nov. 30, 2012

(65) Prior Publication Data
US 2013/0142240 A1    Jun. 6, 2013

(30) Foreign Application Priority Data
Dec. 2, 2011   (JP) ................. 2011-264461

(51) Int. Cl.
| G06F 11/00 | (2006.01) |
| H03K 9/00 | (2006.01) |
| G01S 19/40 | (2010.01) |
| H04L 1/00 | (2006.01) |

(52) U.S. Cl.
CPC ............ *H04L 1/0045* (2013.01); *H04L 1/0061* (2013.01)
USPC .......................................... 375/316; 714/800

(58) Field of Classification Search
CPC  H04L 1/0061; H03M 13/45; H03M 13/6325; G01S 19/27; G01S 19/252
USPC .......... 375/340, 316; 714/752, 758, 799, 800, 714/704; 370/242; 342/357.23
See application file for complete search history.

(56) References Cited

U.S. PATENT DOCUMENTS

| 6,292,748 | B1* | 9/2001 | Harrison ...................... 701/478 |
| 6,519,734 | B1* | 2/2003 | Bodnar et al. ................ 714/761 |
| 7,792,222 | B2 | 9/2010 | Tang et al. |
| 2004/0087270 | A1* | 5/2004 | Krasner ....................... 455/12.1 |
| 2006/0126762 | A1* | 6/2006 | Tapucu et al. ................. 375/340 |
| 2009/0129449 | A1* | 5/2009 | Gobara .......................... 375/150 |
| 2010/0134349 | A1* | 6/2010 | Lennen et al. ........... 342/357.03 |
| 2010/0169741 | A1* | 7/2010 | Laurent et al. ................ 714/763 |
| 2011/0050490 | A1* | 3/2011 | Matsue ...................... 342/357.23 |
| 2011/0083062 | A1* | 4/2011 | Luis Vitorio et al. ......... 714/781 |
| 2011/0161773 | A1* | 6/2011 | Martwick et al. ............ 714/755 |
| 2012/0030527 | A1* | 2/2012 | Nakamura et al. ............ 714/704 |

FOREIGN PATENT DOCUMENTS

| JP | 2008-541629 A | 11/2008 |
| WO | 2006/122291 A2 | 11/2006 |

* cited by examiner

*Primary Examiner* — Aristocratis Fotakis
(74) *Attorney, Agent, or Firm* — Kilpatrick Townsend & Stockton LLP

(57) ABSTRACT

A demodulation unit demodulates a received signal in which carrier wave of a navigation message that is modulated according to a BPSK modulation scheme are included. An error detection processing unit performs an error detection process on the demodulation result using an error detection bit that is included in the demodulation result. A verification word generator generates a verification word using the demodulation result and a check code when an error is detected by the error detection process, the check code being determined in advance for each bit of the navigation message based on a predetermined encoding rule. An estimation unit estimates an originating bit of a demodulation error by comparing the verification word generated by the verification word generator with a verification word table stored in a storage unit. A correction unit corrects the demodulation result by inverting the bit values of bits subsequent to the estimated originating bit.

6 Claims, 13 Drawing Sheets

FIG. 1

CHECK CODE TABLE

| | D29* | D30* | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 | |
|---|---|---|---|---|---|---|---|---|---|---|---|---|---|---|---|---|---|---|---|---|---|---|---|---|---|---|---|
| D25 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 | 1 | 0 | |
| D26 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 | 1 | |
| D27 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | 0 | |
| D28 | 0 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | 0 | |
| D29 | 0 | 1 | 1 | 0 | 1 | 0 | 1 | 1 | 1 | 0 | 1 | 1 | 0 | 0 | 0 | 1 | 1 | 1 | 1 | 1 | 0 | 0 | 1 | 1 | 0 | 1 | |
| D30 | 1 | 0 | 0 | 0 | 1 | 0 | 1 | 1 | 0 | 1 | 1 | 1 | 1 | 0 | 1 | 0 | 1 | 0 | 0 | 0 | 1 | 0 | 0 | 1 | 1 | 1 | |
| G | 29 | 16 | 2A | 34 | 3B | 1C | 2F | 37 | 1A | 0D | 7 | 23 | 31 | 38 | 3D | 3E | 1F | 0E | 26 | 32 | 19 | 2C | 16 | 0B | 25 | 13 | |
| | G29* | G30* | G1 | G2 | G3 | G4 | G5 | G6 | G7 | G8 | G9 | G10 | G11 | G12 | G13 | G14 | G15 | G16 | G17 | G18 | G19 | G20 | G21 | G22 | G23 | G24 | |

FIG. 2

VERIFICATION WORD TABLE

| | D29* | D30* | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 |
|---|---|---|---|---|---|---|---|---|---|---|---|---|---|---|---|---|---|---|---|---|---|---|---|---|---|---|
| D25 | — | — | 1 | 0 | 1 | 0 | 0 | 1 | 0 | 0 | 0 | 0 | 0 | 0 | 1 | 0 | 1 | 1 | 1 | 0 | 1 | 1 | 0 | 0 | 0 | 1 |
| D26 | — | — | 1 | 1 | 0 | 1 | 0 | 0 | 1 | 0 | 0 | 0 | 1 | 1 | 0 | 1 | 0 | 1 | 1 | 1 | 0 | 1 | 1 | 0 | 0 | 0 |
| D27 | — | — | 1 | 0 | 0 | 1 | 0 | 1 | 1 | 0 | 1 | 0 | 1 | 1 | 0 | 1 | 0 | 1 | 0 | 0 | 0 | 1 | 0 | 0 | 1 | 1 |
| D28 | — | — | 1 | 1 | 0 | 0 | 1 | 0 | 1 | 1 | 0 | 1 | 1 | 1 | 1 | 0 | 1 | 0 | 1 | 0 | 0 | 0 | 1 | 0 | 0 | 1 |
| D29 | — | — | 0 | 1 | 1 | 0 | 0 | 1 | 0 | 1 | 1 | 0 | 1 | 1 | 1 | 1 | 0 | 1 | 0 | 1 | 0 | 0 | 0 | 1 | 0 | 0 |
| D30 | — | — | 0 | 0 | 0 | 1 | 1 | 0 | 1 | 1 | 0 | 1 | 0 | 1 | 1 | 0 | 0 | 1 | 1 | 1 | 1 | 0 | 0 | 0 | 1 | 0 |
| H | — | — | 3C | 16 | 22 | 19 | 05 | 2A | 1D | 7 | 0A | 0D | 2E | 1F | 27 | 1A | 24 | 3B | 35 | 13 | 21 | 38 | 14 | 2 | 9 | 2C |
| | | | H1 | H2 | H3 | H4 | H5 | H6 | H7 | H8 | H9 | H10 | H11 | H12 | H13 | H14 | H15 | H16 | H17 | H18 | H19 | H20 | H21 | H22 | H23 | H24 |

$H_k = \char`\~(G_k \char`\^ G(k+1) \char`\^ G(k+2) \char`\^ \cdots \char`\^ G24)$

FIG. 5

| SIGNAL STRENGTH [dBm] | IMPROPER RANGE |
|---|---|
| −135~ | −500~+500 |
| −140~−135 | −1000~+1000 |
| −145~−140 | −2000~+2000 |
| −146~−145 | −3000~+3000 |
| −147~−146 | −4000~+4000 |
| ~−147 | −5000~+5000 |

FIG.11

|     | D25 | D26 | D27 | D28 | D29 | D30 |
|-----|-----|-----|-----|-----|-----|-----|
|     | 1   | 0   | 0   | 0   | 0   | 0   |
|     | 1   | 1   | 0   | 0   | 0   | 0   |
|     | 1   | 1   | 1   | 0   | 0   | 0   |
|     | 1   | 1   | 1   | 1   | 0   | 0   |
|     | 1   | 1   | 1   | 1   | 1   | 0   |
|     | 1   | 1   | 1   | 1   | 1   | 1   |
| H   | 3F  | 1F  | 0F  | 07  | 03  | 01  |
|     | H25 | H26 | H27 | H28 | H29 | H30 |

FIG.13

SIGNAL RECEIVING METHOD AND RECEIVER WITH ERROR DETECTION AND CORRECTION

This application claims priority to Japanese Patent Application No. 2011-264461, filed Dec. 2, 2011, the entirety of which is hereby incorporated by reference.

BACKGROUND

1. Technical Field

The present invention relates to a method and the like for receiving a carrier wave of a navigation message that is modulated according to the BPSK (Binary Phase Shift Keying) modulation scheme.

2. Related Art

GPS (Global Positioning System) is widely known as a positioning system that uses a positioning signal, and is used in a receiver that is included in a cellular phone, a car navigation device, and the like. In GPS, the positions of a plurality of GPS satellites and a pseudo distance or the like from the respective GPS satellites to a receiver are obtained using the time measured by a GPS receiver, and finally, a position calculation is performed.

A GPS satellite transmits information regarding a satellite orbit, time, and the like at a bit rate of 50 bps (bits per second) by embedding the information in a navigation message. One navigation message includes one master frame, and one master frame includes 25 frames made up of 1500 bits. In order to acquire all navigation messages, it is necessary to receive the 25 frames that constitute the master frame, which requires 12.5 minutes.

The reception conditions of the GPS satellite signal change depending on the position or the like of a receiver. In a weak field environment, since the signal strength of a received signal is weak, it is difficult to accurately detect a change (bit transition) in the bit value of the navigation message, and there is a possibility that the demodulation of the received signal results in error. JP-T-2008-541629 discloses a method for determining whether the result of the demodulation of a received signal has an error or not.

JP-T-2008-541629 discloses error detection which involves performing checking according to a predetermined computation formula using a 6-bit error detection bit stored at the end of each of the words that are included in the respective subframes of a navigation message.

On the other hand, the GPS satellite signal is subjected to BPSK modulation according to a bit value of the navigation message. Thus, if one demodulation error occurs when a received signal of the GPS satellite signal is demodulated to received data, a problem in which all items of the subsequently demodulated data are in error may occur. Such a problem is noticeable in an environment (weak field environment) where the received signal is a weak electric field signal.

In this case, the checking result of the error detection is highly likely to be "NG". However, it is not efficient to discard received data which have not been correctly demodulated all the time due to one demodulation error. For example, in a weak field environment or the like, if demodulated data is repeatedly considered as "NG", it takes a significant amount of time for collection of parameters necessary for satellite orbit computations, which causes a problem in that the time to first fix (TTFF) increases.

SUMMARY

An advantage of some aspects of the invention is to provide a new method for restoring received data in which a demodulation error occurs.

A first aspect of the invention is directed to a signal receiving method including: receiving a carrier wave of a navigation message that is modulated according to a BPSK (Binary Phase Shift Keying) modulation scheme; demodulating the received signal of the carrier wave; performing an error detection process on the demodulation result using an error detection bit that is included in the demodulation result; generating a verification word using the demodulation result and a check code when an error is detected by the error detection process, the check code being determined in advance for each bit of the navigation message based on a predetermined encoding rule; estimating an originating bit of a demodulation error based on the generated verification word and a predetermined verification word table; and correcting the demodulation result by inverting the bit values of bits subsequent to the estimated originating bit.

As another aspect, the invention may be configured as a receiver including: a receiving unit that receives a carrier wave of a navigation message that is modulated according to a BPSK modulation scheme; a demodulation unit that demodulates the received signal of the carrier wave; an error detection processing unit that performs an error detection process on the demodulation result using an error detection bit that is included in the demodulation result; a verification word generator that generates a verification word using the demodulation result and a check code when an error is detected by the error detection process, the check code being determined in advance for each bit of the navigation message based on a predetermined encoding rule; an estimation unit that estimates an originating bit of a demodulation error based on the generated verification word and a predetermined verification word table; and a correction unit that corrects the demodulation result by inverting the bit values of bits subsequent to the estimated originating bit.

According to the first aspect and the like, the received signal in which the carrier wave of the navigation message that is demodulated according to the BPSK modulation scheme are included is demodulated. The error detection process is performed on the demodulation result using the error detection bit that is included in the demodulation result. The error detection process can be realized as a process that is based on an encoding rule of the navigation message, for example. If one demodulation error occurs when the received data is demodulated from a received signal that is modulated according to the BPSK modulation scheme, a problem in which all items of the subsequently demodulated data are in error may occur. Such a problem is particularly noticeable in an environment (weak field environment) where the received signal is a weak electric field signal.

Therefore, when an error is detected by the error detection process, the verification word is generated using the demodulation result and the check code that is determined in advance for each bit of the navigation message based on a predetermined encoding rule. Moreover, the originating bit of the demodulation error is estimated by comparing the generated verification word with the predetermined verification word table. If the originating bit of the demodulation error can be specified in this way, the demodulation results of the received signal can be corrected by inverting the bit values of the bits subsequent to the originating bit. If the correct received data is obtained by the correction, since accurate information such as satellite orbit parameters can be acquired from the received data, it is possible to restore the received data in which a demodulation error occurs.

As a second aspect of the invention, the signal receiving method of the first aspect may be configured such that the generation of the verification word includes: selecting the check code for each bit of the demodulation result according to the bit value of the bit; generating an estimated bit value of the error detection bit from the selected check code; and generating the verification word from the estimated bit value and the bit value of the error detection bit included in the demodulation result.

According to the second aspect, the check code for each bit of the demodulation result is selected according to the bit value of the bit. Moreover, the estimated bit value of the error detection bit is generated from the selected check code, and the verification word is generated from the estimated bit value and the bit value of the error detection bit included in the demodulation result. Although described in detail later, the verification word can be generated easily by generating the estimated bit value of the error detection bit from the check code that is selected according to a predetermined rule and using the estimated bit value together with the bit value of the error detection bit included in the demodulation result.

As a third aspect of the invention, the signal receiving method of the first or second aspect may be configured such that, the verification word table stores verification word of each originating bit of the demodulation error, and the estimating includes retrieving a bit corresponding to the generated verification word from the verification word table.

According to the third aspect, the originating bit of the demodulation error can be estimated by a simple method of retrieving the bit corresponding to the generated verification word from the verification word table that stores verification word for each originating bit of the demodulation error.

As a fourth aspect of the invention, the signal receiving method of any one of the first to third aspects may be configured such that the signal receiving method further includes: performing correlation computation between the received signal and a replica code with respect to each of the I-signal and Q-signal; and computing an inner product of the result of the correlation computation of the I-signal and the result of the correlation computation of the Q-signal, and the correcting includes performing the correction by inverting the bit values of bits subsequent to the originating bit when the value of the inner product associated with the originating bit satisfies a predetermined condition.

According to the fourth aspect, the correlation computation between the received signal and a replica code is performed with respect to each of the I-signal and Q-signal. Moreover, the inner product of the result of the correlation computation of the I-signal and the result of the correlation computation of the Q-signal is computed. The value of the inner product can be used to determine the presence of the occurrence of a demodulation error in advance when the bit value of the navigation message is demodulated. Therefore, when the value of the inner product associated with the originating bit of the demodulation error satisfies a predetermined condition, it is estimated that the demodulation error has occurred, and the correcting is performed by inverting the bit values of bits subsequent to the originating bit.

As a fifth aspect of the invention, the signal receiving method of the fourth aspect may be configured such that the signal receiving method further includes changing the predetermined condition according to a reception state of the carrier wave.

According to the fifth aspect, by changing the predetermined condition according to the reception state of the carrier wave, it is possible to optimize the condition associated with the determination of the occurrence of the demodulation error.

BRIEF DESCRIPTION OF THE DRAWINGS

The invention will be described with reference to the accompanying drawings, wherein like numbers reference like elements.

FIG. 1 is a diagram illustrating an error detection process.

FIG. 2 is a diagram showing a configuration of a check code table.

FIG. 5 is a diagram showing a configuration of a verification word table.

FIG. 11 is a diagram showing a configuration of an IQ inner product value improper range setting table.

FIG. 13 is a diagram showing a configuration of a verification word table according to a modification example.

DESCRIPTION OF EXEMPLARY EMBODIMENTS

Figure 3:
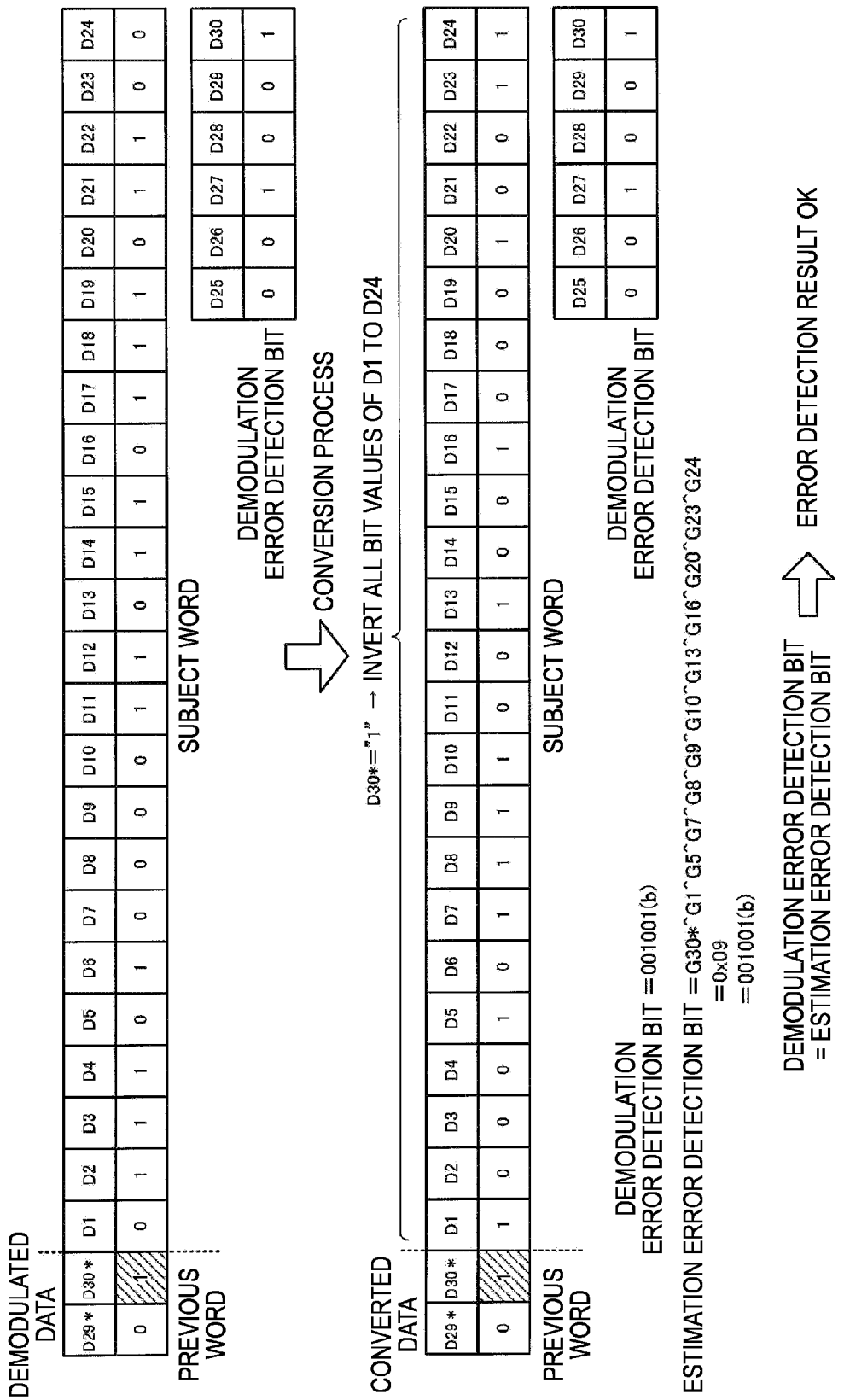
FIG. 3 is a diagram illustrating a specific example of the error detection process.

Hereinafter, an embodiment of the invention will be described in detail with reference to the drawings. In this embodiment, the invention is applied to a GPS (Global Positioning System) which is one type of satellite positioning systems.

1. Principle

A GPS satellite signal is modulated in accordance with a bit value of a navigation message according to the BPSK modulation scheme. The GPS receiver receives carrier waves of the navigation message that is modulated according to the BPSK modulation scheme. Moreover, the GPS receiver demodulates the received signal of the carrier waves to obtain the navigation message.

In the present embodiment, words that constitute the respective subframes of the navigation message are used as the units of carrier data of the navigation message, and the error detection process is performed for the respective words. The error detection process involves executing a process of estimating an originating bit of a demodulation error with respect to a word in which an error is detected and a process of correcting the demodulation results by inverting the bit values subsequent to the estimated originating bit.

1-1. Error Detection Process

First, the error detection process according to the present embodiment will be described. The data of the demodulation results obtained by the GPS receiver demodulating a GPS satellite signal will be referred to as "demodulated data". One word of the navigation message is made up of 30 bits. Thus, the 1st to 30th bits of each word will be denoted by "Dk" (k=1 to 30).

Moreover, a word that is currently being focused, that is, a word that is to be processed will be referred to as a "subject word", and a word immediately before the subject word will be referred to as a "previous word". Symbol "*" is attached to the previous subject word. For example, the 29th bit of the previous word will be denoted as "D29*", and the 30th bit of the previous word will be denoted as "D30*". Moreover, in the following description and the drawings, the operation of an exclusive logical sum (EXOR (EXclusive OR)) is denoted using "^". For example, an exclusive logical sum of "A" and "B" is denoted as "A^B".

Figure 1:
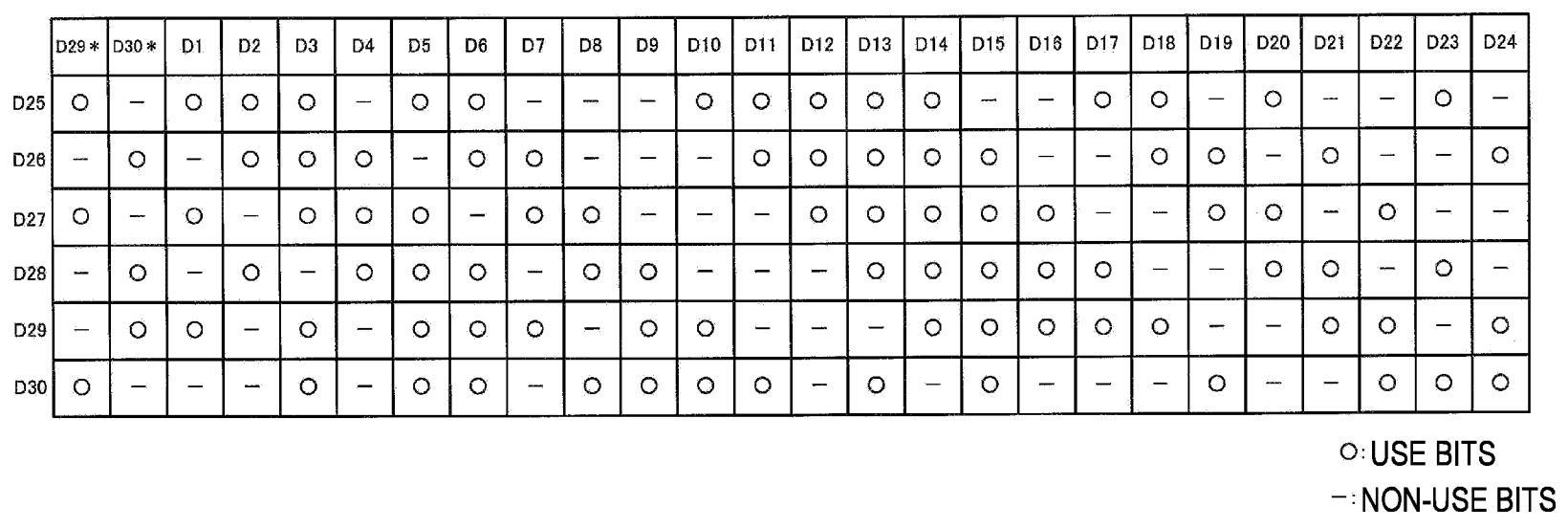

FIG. 1 is a diagram illustrating the error detection process. In FIG. 1, the horizontal column shows the 29th bit "D29*" and the 30th bit "D30*" of the previous word and the 1st to 24th bits "D1 to D24" of the subject word.

According to the encoding rule of the navigation message in the GPS, when the bit value of the 30th bit of the previous word is "1" (D30*="1"), the data obtained by inverting all bit values of the 1st to 24th bits "D1 to D24" of the subject word is source data. In contrast, when the bit value of the 30th bit of the previous word is "0" (D30*="0"), the demodulated data of the 1st to 24th bits "D1 to D24" of the subject word is the source data as they are. The process for obtaining the source data will be referred to as a "conversion process".

In FIG. 1, the vertical column shows the 25th to 30th bits of the subject word. These 6 bits are bits for error detection (error detection bits). When parity checking is performed, these 6 bits are parity bits. In the error detection process of the present embodiment, the bit value of a demodulated error detection bit (hereinafter referred to as a "demodulation error detection bit") is compared with the bit value of an error detection bit (hereinafter referred to as an "estimation error detection bit") estimated using converted data. When the two bit values are identical, the result of the error detection is considered as "OK" (no error detected). In contrast, when the two bit values are not identical, the result of the error detection is considered as "NG" (error detected).

In the table made up of the vertical column and the horizontal column in FIG. 1, bits (hereinafter referred to as "use bits") that are used for generating the bit values of the bits "D25" to "D30" that constitute the estimation error detection bit are denoted by "O", and bits (hereinafter referred to as "non-use bits") that are not used for generating the bits "D25" to "D30" are denoted by "-".

For example, the use bits used for generating the starting bit "D25" of the error detection bits are "D29*", "D1", "D2", "D3", "D5", "D6", "D10", "D11", "D12", "D13", "D14", "D17", "D18", "D20", and "D23".

In FIG. 1, by substituting "1" for "O" correlated with the use bits and "0" for "-" correlated with the non-use bits, it is possible to create a table as shown in FIG. 2. This table is referred to as a "check code table". In the check code table, for each of the bits shown on the horizontal column, the check code "G" shown at the bottom is a hexadecimal expression of the 6 bits arranged on the vertical column from top to bottom. The check code of each bit is denoted as "Gk" (k=29, 30, 1, 2, . . . , 24).

Here, the error detection process will be described by way of a specific example. A case where demodulated data as shown on top of FIG. 3 is obtained will be discussed. In this case, since the bit value of the 30th bit of the previous word is "1" (D30*="1"), all bit values of the 1st to 24th bits of the subject word within the demodulated data are inverted. By this conversion process, the converted data as shown at the bottom of FIG. 3 is obtained.

Subsequently, in this converted data, bits of which the bit value is "1" are extracted. As a result, "D30*", "D1", "D5", "D7", "D8", "D9", "D10", "D13", "D16", "D20", "D23", and "D24" are extracted. Moreover, check codes "Gk" corresponding to the respective extracted bits are selected, and an exclusive logical sum thereof is computed.

A computation result of the exclusive logical sum computed in this way is an estimation error detection bit. Specifically, "(estimation error detection bits)= G30*^G1^G5^G7^G8^G9^G10^G13^G16^G20^G23^G24= 0x09=001001(b)". In the demodulated data of FIG. 3, the bit values of the 25th to 30th bits which are the demodulation error detection bits of the subject word are "001001(b)". Since "(demodulation error detection bits)=(estimation error detection bits)", the error detection result is "OK".

1-2.1 Bit Correction

Figure 4:
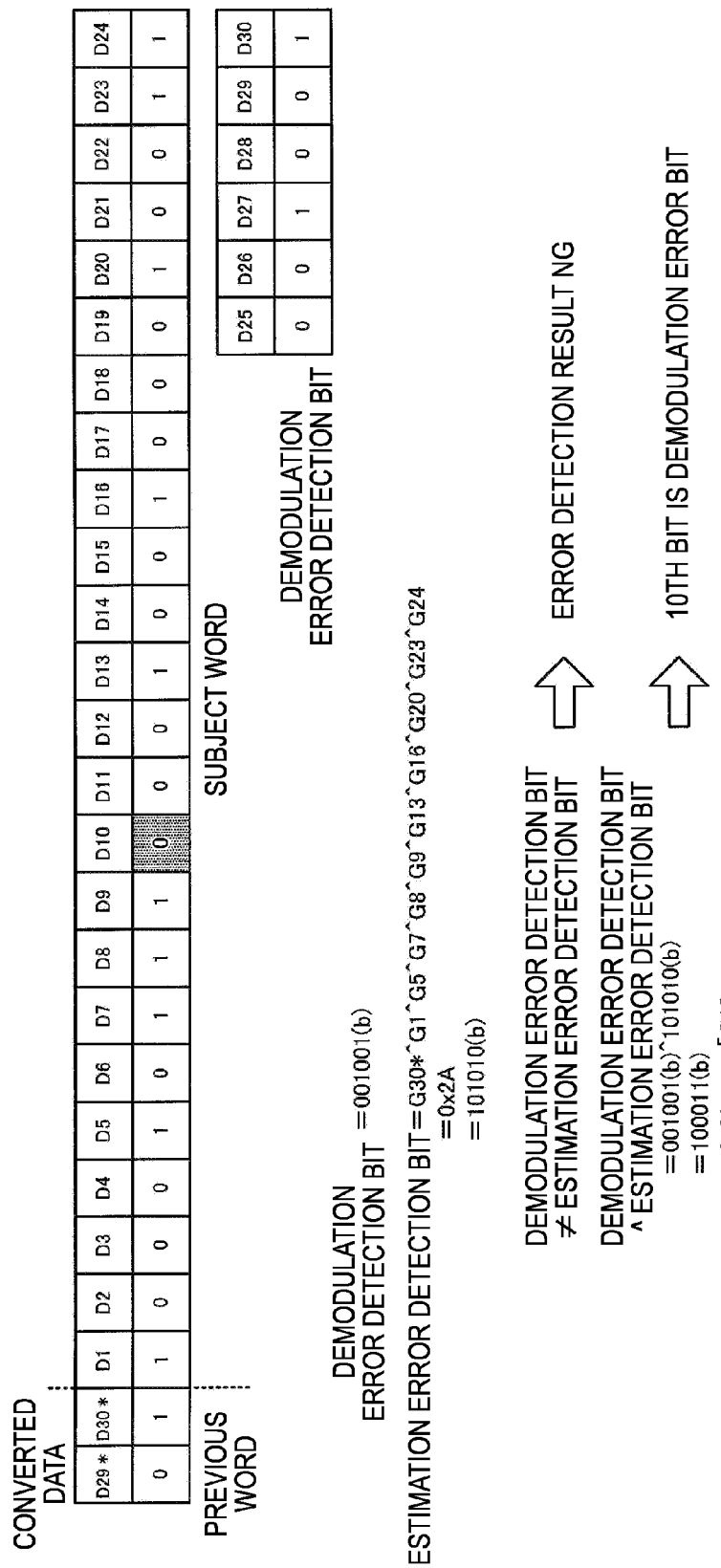
FIG. 4 is a diagram illustrating a specific example of 1-bit correction.

Next, a case where a demodulation error of "1 bit" occurs when a received signal is demodulated will be discussed. For example, this is the case where in the demodulated data of FIG. 3, a demodulation error occurs in the 10th bit, and the 10th bit value which is to be obtained actually is demodulated in an inverted manner. In this case, the converted data after the conversion process is as shown in FIG. 4. The bit value of the 10th bit after the conversion process is obtained as "0" because demodulation fails although the 10th bit value should actually be demodulated as "1". In this case, the estimation error detection bit is generated in the above-described order.

Bits of which the bit value is "1" are extracted as "D30*", "D1", "D5", "D7", "D8", "D9", "D13", "D16", "D20", "D23", and "D24". The check codes "Gk" corresponding to these bits are selected, the exclusive logical sum of these check codes is computed.

Specifically, "(estimation error detection bits)= G30*^G1^G5^G7^G8^G9^G13^G16^G20^G23^G24=0x2A= 101010(b)". In the demodulated data of FIG. 4, the bit values of the demodulation error detection bits of the subject word are "001001(b)". Since "(demodulation error detection bits)#"(estimation error detection bits)", the error detection result is "NG".

In this case, since the bit where a demodulation error occurs is "1 bit", the bit where the demodulation error occurs can be specified by computing an exclusive logical sum of the demodulation error detection bit and the estimation error detection bit. If the bit values of all bits are demodulated correctly, the exclusive logical sum of the demodulation error detection bit and the estimation error detection bit is computed as "0x00". However, when a demodulation error of 1 bit occurs, the exclusive logical sum of the demodulation error detection bit and the estimation error detection bit is not "0x00" but has the same value as the check code "Gk" correlated with the bit where the demodulation error occurs.

In the example of FIG. 4, the exclusive logical sum of the demodulation error detection bit and the estimation error detection bit is computed as "(demodulation error detection bit)^(estimation error detection bit)=001001(b)^ 101010(b)= 100011(b)=0x23". The "0x23" is identical to the 10th check code "G10 (=0x23)" among the check codes defined in FIG. 2. Thus, the 10th bit can be understood as being the demodulation error bit, and the bit value thereof can be corrected from "0" to "1".

1-3. Estimation of Demodulation Error Originating Bit

Since the GPS satellite signal is demodulated in accordance with the bit value of the navigation message according to the BPSK modulation scheme, if one demodulation error occurs (a demodulation error of 1 bit occurs) when received data is demodulated from a received signal, a problem in which all items of the subsequent demodulated data are in error may occur. Such a problem is noticeable in an environment (weak field environment) where the received signal is a weak electric field signal. For example, in the example of FIG. 4, when a demodulation error occurs in the 10th bit value, all of the subsequent bit values are demodulated in an inverted manner.

In this case, in the 1-bit correction method that uses the check code "Gk", it is difficult to specify the bit where a demodulation error occurs. Thus, in the present embodiment, a verification word "Hk" that can be derived from the check code "Gk" is introduced. A verification word "Hk" of the k-th (where, k=1 to 24) bit of a subject word is generated by computing an exclusive logical sum of the check codes ranging from the check code "Gk" of the k-th bit to the check code "G24" of the 24th bit which is the last bit excluding the error detection bit.

Specifically, the verification word "Hk" (k=1 to 24) is generated according to Expression (1).

$$Hk = \sim(Gk \hat{\;} G(k+1) \hat{\;} G(k+2) \hat{\;} \ldots \hat{\;} G24) \quad (1)$$

Here, "~" is a logical NOT operator that inverts all bit values.

FIG. 5 is a diagram showing the verification word "Hk" (k=1 to 24) generated according to Expression (1) in a table format. This table is referred to as a "verification word table". In the verification word table, the verification words "Hk" are expressed as a hexadecimal number at the bottom of each of the bits shown on the horizontal column. Moreover, for each of the bits shown on the horizontal column, the 6 bits arranged on the vertical column from top to bottom are the binary expression of the verification word "Hk" defined for the corresponding bit.

A specific example will be described. An example of a data string of demodulated data when all bit values are demodulated correctly is shown on top of FIG. 6. In this data string, a demodulation error occurs in the 5th bit value, and as a result, all of the subsequent bits are demodulated in an inverted manner. The demodulation results are shown on the middle.

Figure 6:
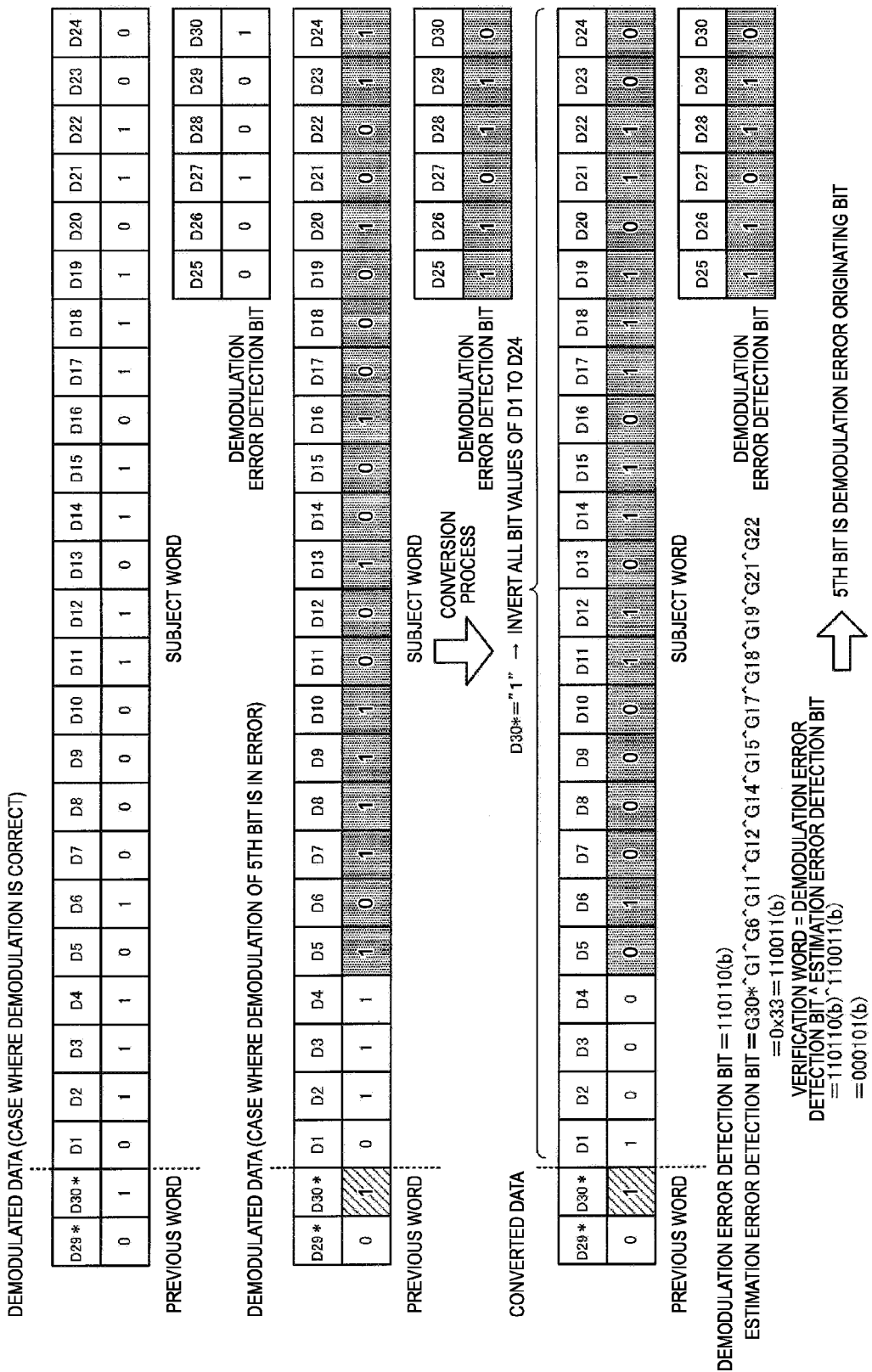
FIG. 6 is a diagram illustrating a specific example of bit correction.

In this case, in the demodulated data, since the bit value of the 30th bit of the previous word is "1" (D30*="1"), all bit values of the 1st to 24th bits of the subject word are inverted. By this conversion process, the converted data as shown at the bottom of FIG. 6 is obtained.

In the converted data obtained in this way, bits of which the bit value is "1" are extracted. As a result, "D30*", "D1", "D6", "D11", "D12", "D14", "D15", "D17", "D18", "D19", "D21" and "D22" are extracted. Moreover, the check codes "Gk" defined for the respective bits are selected. This corresponds to selecting the check code corresponding to each of the respective bits of the demodulation results in accordance with the bit value thereof. Moreover, the exclusive logical sum of the selected check codes "Gk" is computed.

The result of the exclusive logical sum is the estimation error detection bit as described above. Specifically, "(estimation error detection bits)= G30*^G1 ^G6^G11^G12^G14^G15^G17^G18^G19^G21^G22=0x33= 110011(b)". In the demodulated data of FIG. 6, "(demodulation error detection bits)=110110(b)". Since "(demodulation error detection bits)≠(estimation error detection bits)", the error detection result is "NG".

In this case, an originating bit of the demodulation error (hereinafter referred to as a "demodulation error originating bit") can be specified by computing the exclusive logical sum of the demodulation error detection bit and the estimation error detection bit. Specifically, when the exclusive logical sum of the demodulation error detection bit and the estimation error detection bit is computed, the computed value has the same value as the verification word "Hk" correlated with the demodulation error originating bit among the verification words "Hk" defined in FIG. 5.

In FIG. 6, the verification word is generated by computing the exclusive logical sum of the demodulation error detection bit and the estimation error detection bit. Specifically, "(verification word)=(demodulation error detection bit)^(estimation error detection bit)=110110(b)^110011(b)=000101(b)= 0x05" is generated. This corresponds to generating an estimated bit value of an error detection bit from the selected check code and generating the verification word from the estimated bit value and the bit values of error detection bits included in the demodulation results.

Bits corresponding to the verification word generated in this way are retrieved from the verification word table of FIG. 5. As a result, it can be understood that the retrieved bits are identical to the verification word "H5=0x05" that is correlated with the 5th bit. Thus, the 5th bit can be specified as the demodulation error originating bit.

1-4. Correction of Demodulation Results

In the subject word, all of the bit values subsequent to the demodulation error originating bit that is estimated according to the above estimation method are demodulated in an inverted manner. For example, in the example of FIG. 6, the bit values of the bits subsequent to the 5th bit which is the demodulation error originating bit are demodulated in an inverted manner. Thus, in this case, the demodulation results are corrected by inverting all of the bit values of the 5th to 24th bits "D5" to "D24" and the bits "D25" to "D30" which are the demodulation error detection bits. In this way, final data which is the data of the corrected demodulation results is obtained.

2. Embodiment

Next, an embodiment of a receiver that estimates demodulation error originating bits using the demodulation error originating bit estimation method described in the Principle section and corrects demodulation results using the demodulation result correction method described in the Principle section will be described. In this example, an embodiment of a cellular phone will be described as an example of an electronic apparatus that includes a receiver. It should be noted that embodiments to which the invention can be applied are not limited to the embodiment described below.

2-1. Configuration of Cellular Phone

Figure 7:
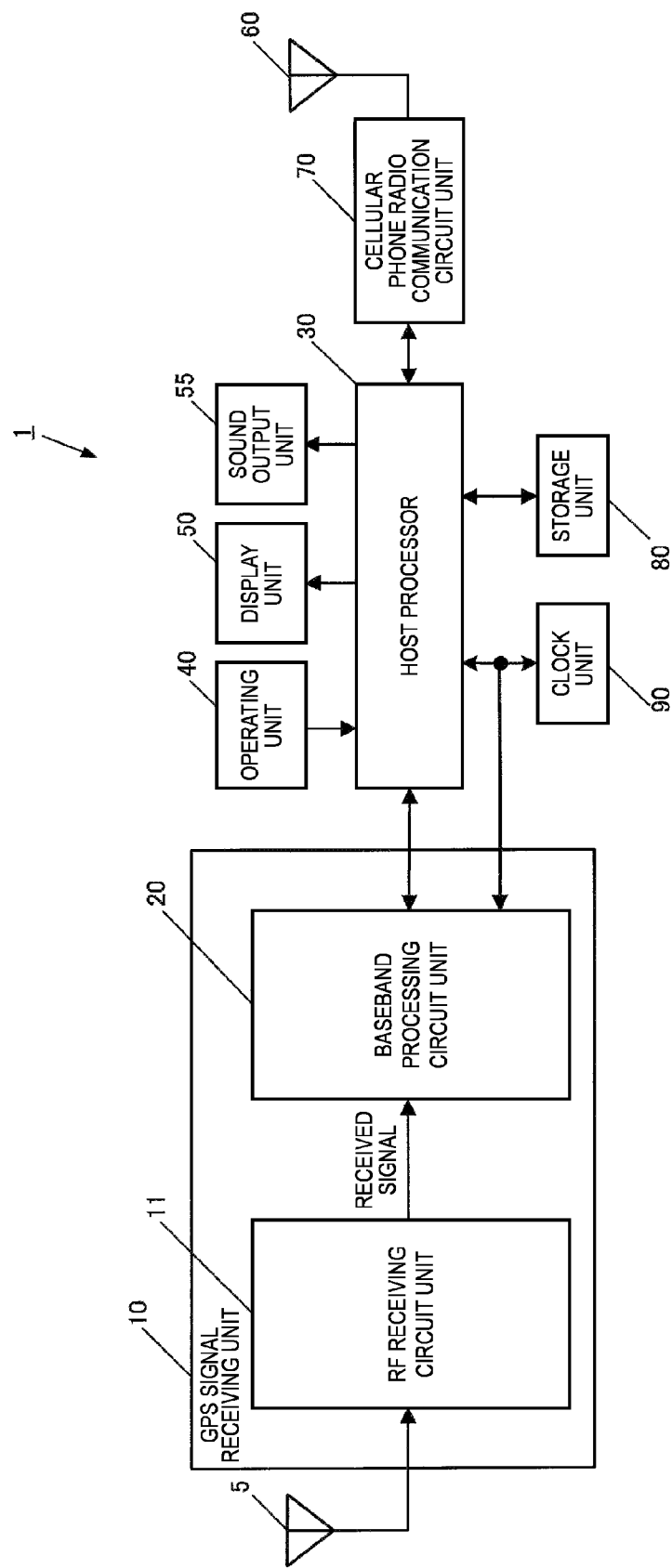
FIG. 7 is a diagram showing an example of a functional configuration of a cellular phone.

FIG. 7 is a block diagram showing an example of a functional configuration of a cellular phone 1 according to the present embodiment. The cellular phone 1 includes a GPS antenna 5, a GPS signal receiving unit 10, a host processor 30, an operating unit 40, a display unit 50, a sound output unit 55, a cellular phone antenna 60, a cellular phone radio communication circuit unit 70, a storage unit 80, and a clock unit 90.

The GPS antenna 5 is an antenna that receives a radio frequency (RF) signal in which GPS satellite signals transmitted from GPS satellites are included, and outputs the received signal to the GPS signal receiving unit 10. The GPS satellite signal is a communication signal of 1.57542 [GHz] that is modulated according to a CDMA (Code Division Multiple Access) method known as a spread spectrum method using a C/A (Coarse and Acquisition) code which is one type of spread codes. The C/A code is a pseudo random noise code in which a code length of 1023 chips is used as 1-PN frame, and the repetition cycle is 1 ms, and is a code unique to the respective GPS satellites.

The GPS signal receiving unit 10 is a circuit or a device that calculates the position of the cellular phone 1 based on the signal output from the GPS antenna 5, and is a functional block that corresponds to a so-called GPS receiver. In the present embodiment, the GPS signal receiving unit 10 corresponds to a receiver.

The GPS signal receiving unit 10 includes an RF signal receiving circuit unit 11 and a baseband processing circuit unit 20. The RF signal receiving circuit unit 11 and the baseband processing circuit unit 20 may be manufactured as individual LSI (Large Scale Integration) and may be manufactured as one chip.

The RF signal receiving circuit unit 11 is a circuit for receiving RF signals. As a circuit configuration, the RF signal receiving circuit unit 11 may be configured, for example, as a signal receiving circuit that converts the RF signal output from the GPS antenna 5 into a digital signal with the aid of an A/D converter and processes the digital signal. Moreover, the RF signal receiving circuit unit 11 may be configured to process the analog RF signal output from the GPS antenna 5, perform A/D conversion to obtain a digital signal, and output the digital signal to the baseband processing circuit unit 20.

In the latter case, the RF signal receiving circuit unit 11 may be configured as follows, for example. That is, a predetermined oscillation signal is divided or multiplied to generate an oscillation signal for RF signal multiplication. The generated oscillation signal is multiplied to the RF signal output from the GPS antenna 5 to down-convert the RF signal into a signal (hereinafter, referred to as an "IF (Intermediate Frequency) signal") of an intermediate frequency. The IF signal is amplified and converted into a digital signal with the aid of an A/D converter, and the digital signal is output to the baseband processing circuit unit 20.

The baseband processing circuit unit 20 performs carrier removal processing, correlation computation, and the like with respect to the received signal output from the RF signal receiving circuit unit 11 to capture the GPS satellite signal, and calculate the position and the clock error of the cellular phone 1 using the time information, the satellite orbit information, and the like extracted from the GPS satellite signal.

The host processor 30 is a processor that controls the respective units of the cellular phone 1 in an integrated manner according to various programs such as a system program stored in the storage unit 80, and includes processors such as a CPU (Central Processing Unit). The host processor 30 displays a map on which the current position is indicated on the display unit 50 based on the positional coordinates acquired from the baseband processing circuit unit 20 and uses the positional coordinates in processing various applications.

The operating unit 40 is an input device that includes a touch panel, button switches, and the like, for example, and outputs a signal corresponding to a pressed key or button to the host processor 30. By the operation of the operating unit 40, various instructions such as a call request, a mail transmission and reception request, an execution request for various applications, or a position calculation request are input.

The display unit 50 is a display device that includes an LCD (Liquid Crystal Display) or the like, and performs various display operations based on a display signal output from the host processor 30. A position display screen, time information, and the like are displayed on the display unit 50.

The sound output unit 55 is a sound output device that includes a speaker or the like, and outputs various sounds based on a sound output signal output from the host processor 30. The voice during calls, a voice guide associated with various applications, and the like are output from the sound output unit 55.

The cellular phone antenna 60 is an antenna for transmitting and receiving radio signals for cellular phones to and from a wireless base station that is installed by the communication service provider of the cellular phone 1.

The cellular phone radio communication circuit unit 70 is a cellular phone communication circuit unit that includes an RF conversion circuit, a baseband processing circuit, and the like, and realizes establishment of calls, transmission and reception of mails, and the like by modulating and demodulating radio signals for cellular phones.

The storage unit 80 includes a storage device such as a ROM (Read Only Memory), a flash ROM, or a RAM (Random Access Memory), and stores a system program for controlling the cellular phone 1, various programs, data, and the like for processing various applications by the host processor 30.

The clock unit 90 is an internal clock of the cellular phone 1 and includes a crystal oscillator that includes a crystal vibrator and an oscillation circuit. The time measured by the clock unit 90 is output to the baseband processing circuit unit 20 and the host processor 30 as needed. The time measured by the clock unit 90 is corrected based on a clock error calculated by the baseband processing circuit unit 20.

2-2. Circuit Configuration of Baseband Processing Circuit Unit

Figure 8:
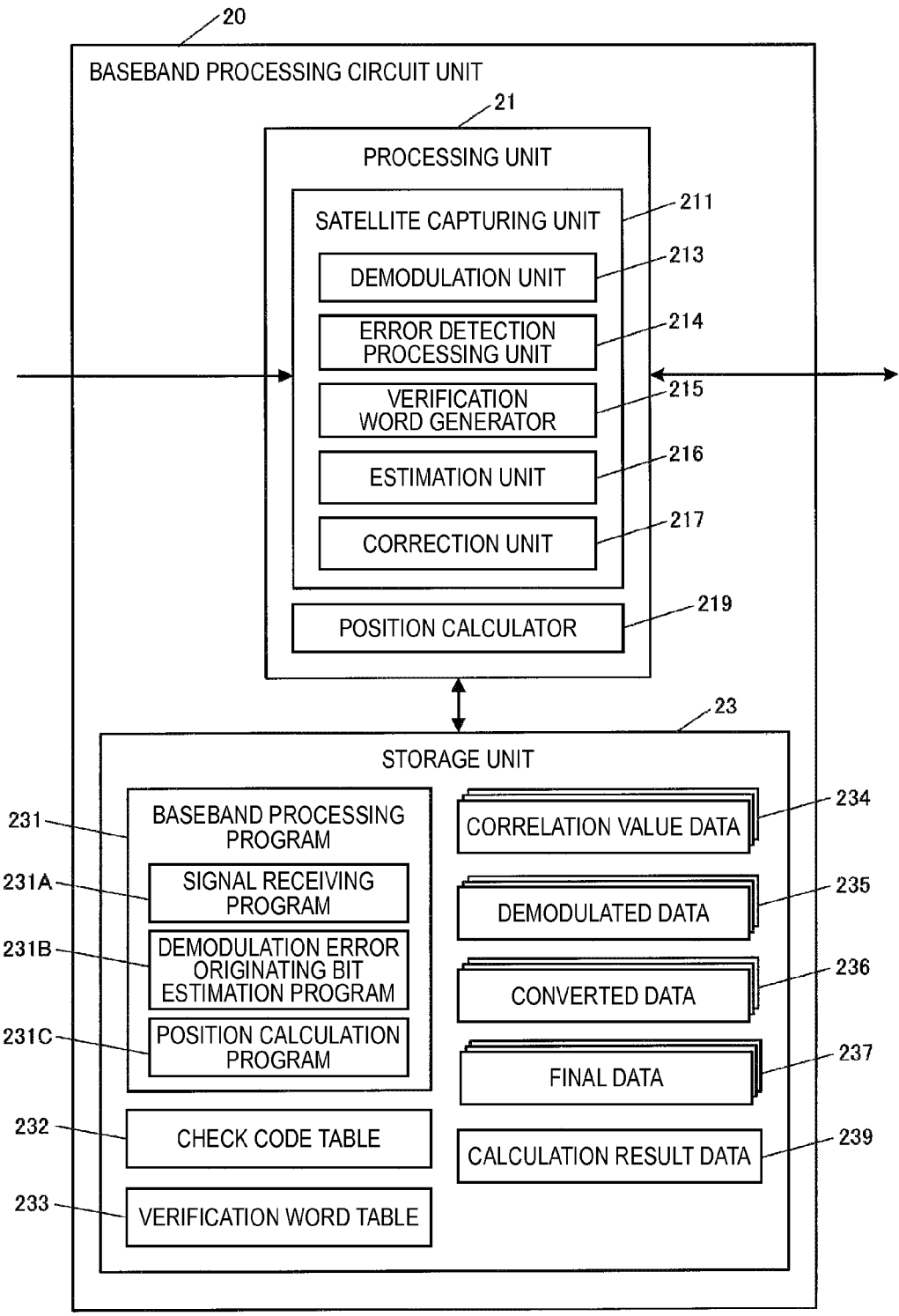
FIG. 8 is a diagram showing an example of a configuration of a baseband processing circuit unit.

FIG. 8 is a diagram showing an example of a circuit configuration of the baseband processing circuit unit 20 and is a diagram showing only the circuit blocks associated with the present embodiment. The baseband processing circuit unit 20 includes a processing unit 21 and a storage unit 23 as a main configuration thereof.

The processing unit 21 is a control device and computation device that controls the respective functional units of the baseband processing circuit unit 20 in an integrated manner, and includes processors such as a CPU or a DSP (Digital Signal Processor). The processing unit 21 includes a satellite capturing unit 211 and a position calculator 219 as a main configuration thereof.

The satellite capturing unit 211 is a functional unit that captures a GPS satellite (GPS satellite signal). Specifically, the satellite capturing unit 11 performs digital signal processing such as carrier removal or correlation computation with respect to the digital received signal output from the RF signal receiving circuit unit 11 and captures a GPS satellite based on the result of the digital signal processing.

In the present embodiment, the satellite capturing unit 211 includes a demodulation unit 213, an error detection processing unit 214, a verification word generator 215, an estimation unit 216, and a correction unit 217. It should be noted that these functional units are exemplified as one embodiment, and all of these functional units are not necessarily the essential constituent components.

The demodulation unit 213 demodulates a received signal in which the carrier waves of a navigation message that is demodulated according to the BPSK modulation scheme are included.

The error detection processing unit 214 performs an error detection process on the results of the demodulation by the demodulation unit 213 using an error detection bit included in the demodulation results.

The verification word generator 215 generates a verification word for a word, in which an error is detected by the error detection process, using the demodulation results of the demodulation unit 213 and a check code "Gk" that is determined in advance for each bit of the navigation message based on a predetermined encoding rule.

The estimation unit 216 estimates an originating bit of the demodulation error for the word, in which an error is detected by the error detection process, based on the verification word generated by the verification word generator 215 and a verification word table 233 stored in the storage unit 23.

The correction unit 217 corrects the demodulation results of the demodulation unit 213 by inverting the bit values of the bits subsequent to the originating bit estimated by the estimation unit 216.

The position calculator 219 performs a predetermined position calculation process using the navigation messages demodulated for the respective GPS satellites and the measurement information (a code phase, a Doppler frequency, a pseudo distance, a pseudo distance variation) acquired for the respective GPS satellites. In this way, the position (positional coordinates) and the clock error (clock bias) of the cellular phone 1 are calculated. The position calculation process can be realized as a process that employs a method such as a least mean square method or a Kalman filter.

The storage unit 23 stores a system program of the baseband processing circuit unit 20, various programs, data, and the like for realizing various functions such as a satellite capturing function, a received signal demodulation function, a demodulation error originating bit estimation function, a bit correction function, and a position calculation function. Moreover, the storage unit 23 includes a work area in which data under processing for various processes, the processing results, and the like are temporarily stored.

The storage unit 23 stores a baseband processing program 231 as the program, which is read by the processing unit 21 and executed as a baseband process. The baseband processing program 231 includes subroutine programs which include a signal receiving program 231A that is executed as a signal receiving process (see FIG. 9), a demodulation error originating bit estimation program 231B that is executed as a demodulation error originating bit estimation process (see FIG. 10), and a position calculation program 231C that is executed as a position calculation process. Since the position calculation process is known, description based on the corresponding flowchart is not provided.

Moreover, the storage unit 23 stores a check code table 232, a verification word table 233, correlation value data 234, demodulated data 235, converted data 236, final data 237, and calculation result data 239 as main data.

The check code table 232 is a table in which the check codes "Gk" of each bit are stored, and the table configuration example thereof is as shown in FIG. 2.

The verification word table 233 is a table in which the verification words "Hk" of each demodulation error originating bit are stored, and the table configuration example thereof is as shown in FIG. 5.

The correlation value data 234 is data in which the data of a correlation value acquired by the satellite capturing unit 211 computing a correlation between the received signal (received C/A code) and a replica C/A code is stored for respective GPS satellites.

The demodulated data 235 is data in which the demodulated data demodulated by the demodulation unit 213 is stored for the respective GPS satellites.

The converted data 236 is data in which the converted data acquired by performing a conversion process on the demodulated data 235 is stored for the respective GPS satellites.

The final data 237 is data in which the final data acquired by correcting the bit values of the converted data 236 is stored for the respective GPS satellites.

The calculation result data 239 is the data of the calculation results acquired by the position calculator 219 performing the position calculation process, and includes the calculate position (positional coordinates) and the calculated clock error (clock bias) of the cellular phone 1.

2-3. Process Flow

Figure 9:
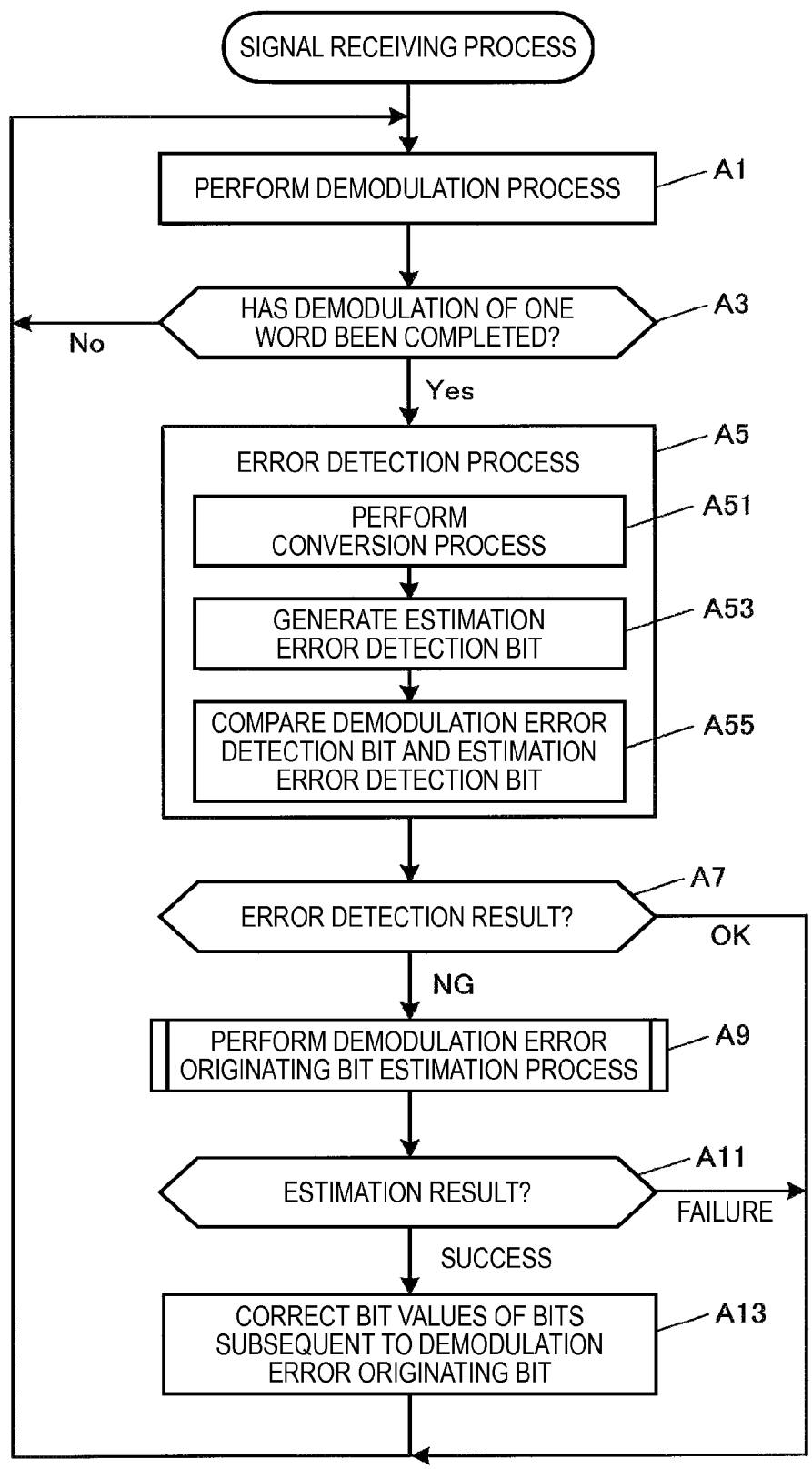
FIG. 9 is a flowchart showing the flow of a signal receiving process.

FIG. 9 is a flowchart showing the flow of the signal receiving process executed by the processing unit 21 of the baseband processing circuit unit 20 according to the signal receiving program 231A stored in the storage unit 23. This signal receiving process is a process performed with respect to the respective GPS satellites that are to be captured. In this example, it is assumed that a correlation computation between a received signal and a replica C/A code is performed as needed so that the correlation value is stored in the correlation value data 234 as needed.

The demodulation unit 213 performs a demodulation process of demodulating the received signal of carrier waves and stores the demodulation results in the storage unit 23 as the demodulated data 235 (step A1). Moreover, the demodulation unit 213 determines whether demodulation of one word has been completed (step A3), and when it is determined that the demodulation has not been completed (step A3: No), the flow returns to step A1. Moreover, when it is determined that the demodulation of one word has been completed (step A3: Yes), the error detection processing unit 214 performs an error detection process on a subject word (step A5).

Specifically, the error detection processing unit 214 performs a conversion process on the demodulated data and stores the demodulation results in the storage unit 23 as the converted data 236 (step A51). Moreover, the error detection processing unit 214 generates an estimation error detection bit (step A53) and compares the demodulation error detection bit with the estimation error detection bit (step A55). If the two bits are identical, an error detection result of "OK" is output. Moreover, if the two bits are not identical, an error detection result of "NG" is output.

Subsequently, the satellite capturing unit 211 determines the result of the error detection process (step A7). When the result is determined to be "NG" (step A7: NG), the demodulation error originating bit estimation process is performed according to the demodulation error originating bit estimation program 231B stored in the storage unit 23 (step A9).

Figure 10:
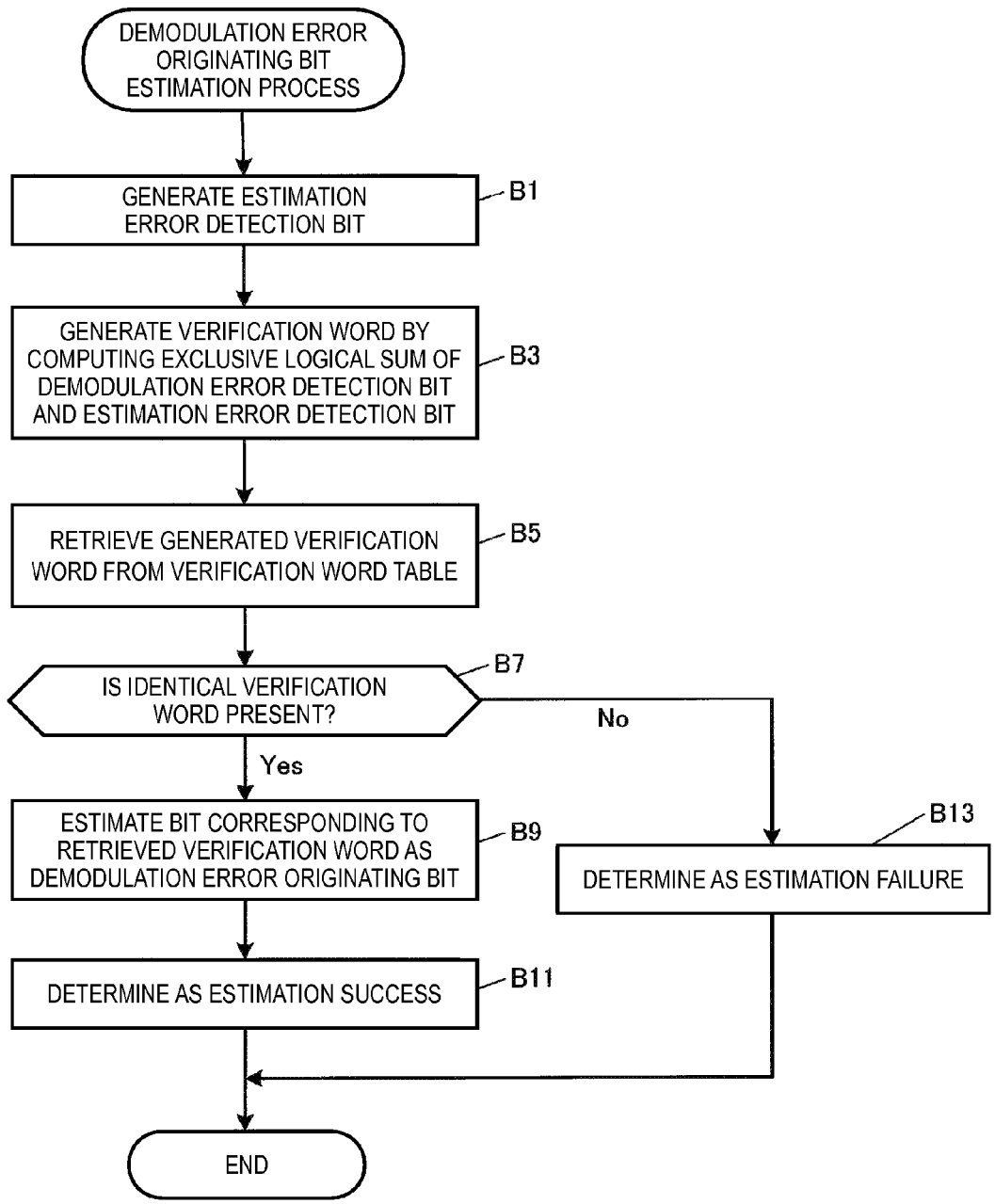
FIG. 10 is a flowchart showing the flow of a demodulation error originating bit estimation process.

FIG. 10 is a flowchart showing the flow of the demodulation error originating bit estimation process.

The verification word generator 215 generates an estimation error detection bit using the converted data 236 obtained by the error detection process (step B1). Moreover, the verification word generator 215 generates a verification word by computing an exclusive logical sum of the demodulation error detection bit and the estimation error detection bit (step B3).

Subsequently, the estimation unit 216 retrieves the verification word generated in step B3 from the verification word table 233 stored in the storage unit 23 (step B5). Moreover, the estimation unit 216 determines whether an identical verification word is present (step B7). When it is determined that an identical verification word is present (step B7: Yes), the estimation unit 216 estimates a bit corresponding to the retrieved verification word as the demodulation error originating bit (step B9). Moreover, the estimation unit 216 determines the estimation result as an estimation success (step B11) and ends the demodulation error originating bit estimation process.

On the other hand, when it is determined in step B7 that an identical verification word is not present (step B7: No), the estimation unit 216 determines the estimation result as an estimation failure (step B13) and ends the demodulation error originating bit estimation process.

Returning to the signal receiving process of FIG. 9, after performing the demodulation error originating bit estimation process, the satellite capturing unit 211 determines the estimation result of the demodulation error originating bit (step A11). When the estimation result is a success (step A11: success), the correction unit 217 corrects the demodulation results by inverting the bit values of the bits subsequent to the demodulation error originating bit and stores the correction results in the storage unit 23 as the final data 237 (step A13). After that, the flow returns to step A1.

On the other hand, when it is determined in step A7 that the error detection result is "OK" (step A7: OK), or it is determined in step A11 that the estimation result is "failure" (step A11: failure), the satellite capturing unit 211 returns to step A1.

2-4. Operations and Advantages

In the baseband processing circuit unit 20, the demodulation unit 213 demodulates the received signal in which the carrier waves of the navigation message that is modulated according to the BPSK modulation scheme are included. Moreover, the error detection processing unit 214 performs an error detection process on the demodulation results using the error detection bit included in the demodulation results. If one demodulation error occurs when the received data is demodulated from a received signal that is modulated according to the BPSK modulation scheme, a problem in which all items of the subsequently demodulated data are in error may occur. Such a problem is particularly noticeable in an environment (weak field environment) where the received signal is a weak electric field signal.

Therefore, when an error is detected by the error detection process, the verification word generator 215 generates a verification word using the demodulation results and the check codes that are determined in advance for each bit of the navigation message based on a predetermined encoding rule. Moreover, the estimation unit 216 compares the verification word generated by the verification word generator 215 with the verification word table 233 stored in the storage unit 23 to estimate the originating bit of the demodulation error. If the originating bit of the demodulation error can be specified in this way, the correction unit 217 corrects the demodulation results of the received signal by inverting the bit values of the bits subsequent to the bit that is demodulated in an inverted manner. If the correct received data is obtained by the correction, since accurate information such as satellite orbit parameters can be acquired from the received data, it is possible to restore the received data in which a demodulation error occurs.

3. Modification Example

Embodiments to which the invention can be applied are not limited to the above embodiment, and can be modified appropriately without departing from the spirit of the invention. Hereinafter, a modification example will be described. In the modification example, the same constituent components as those of the above embodiment and the same steps in the flowcharts as those of the above embodiment will be denoted by the same reference numerals and step numbers, and redundant description thereof will not be provided.

3-1. Determination of Bit Change Using IQ Inner Product Value

The correlation computation between the received signal and the replica code may be performed with respect to each of the I- and Q-signals, and the presence of a change of the bit value of a navigation message may be determined based on the value of the inner product of the results of the correlation computation of the I- and Q-signals. Moreover, when the value of the inner product associated with the originating bit satisfies a predetermined condition, the correction may be performed by inverting the bit values of the bits subsequent to the originating bit.

The inner product value (hereinafter referred to as an "IQ inner product value") "Dot(n,n+1)" of the results of the correlation computation of the I- and Q-signals with respect to the n-th bit and (n+1)th bit of each of the words that constitute a navigation message is calculated according to Expression (2) below.

$$\mathrm{Dot}(n,n+1) = \mathrm{Sum}I(n) \times \mathrm{Sum}I(n+1) + \mathrm{Sum}Q(n) \times \mathrm{Sum}Q(n+1) \quad (2)$$

Here, "SumI" is the sum of the I-phase correlation values for 20 msec, and "SumQ" is the sum of the Q-phase correlation values for 20 msec.

When the IQ inner product value is positive (Dot(n,n+1)>0), it can be determined that the bit value at the boundary between the n-th bit and the (n+1)th bit is not inverted. In contrast, when the IQ inner product value is negative (Dot(n,n+1)<0), it can be determined that the bit value at the boundary between the n-th bit and the (n+1)th bit is inverted.

When a navigation message is demodulated, after detecting an inversion position of a certain bit, the IQ inner product value is computed every 20 milliseconds from that inversion position, and it is determined whether the bit value is inverted or not based on the sign of the computed IQ inner product value. That is, when the IQ inner product value is positive, the bit value is considered as having not being inverted, and the previous bit value is used as the subsequent bit value as it is. In contrast, when the IQ inner product value is negative, the bit value is considered as having been inverted, an inverted value of the previous bit value is used as the subsequent bit value.

If the received signal in which the GPS satellite signal is included is a strong signal, the sign of the IQ inner product value tends to be clearly classified into a case where the bit value is not inverted and a case where the bit value is inverted. However, in a weak field environment or the like, since the received signal in which the GPS satellite signal is included is a weak signal, the correlation value is generally small. In this case, if the IQ inner product value is computed according to Expression (2), the sign of the IQ inner product value is not clearly classified into a case where the bit value is not inverted and a case where the bit value is inverted, and the boundary thereof tends to be unclear.

Therefore, a condition for determining the IQ inner product value to be improper is set. Specifically, a numerical value range around zero, for example, is set for determining the IQ inner product value to be improper. When the IQ inner product value falls within this numerical value range, it is determined that the reliability of the determination result of the presence of a change of the bit value is low, and that the possibility that a demodulation error occurs in the corresponding bit is high. In this modification example, the numerical value range (predetermined condition) is changed according to the reception state of carrier waves.

FIG. 11 is a diagram showing an example of a configuration of an IQ inner product value improper range setting table in which the improper range of the IQ inner product value of the above case is determined. In the IQ inner product value improper range setting table, the signal strength (unit: dBm) of the received signal of carrier waves and the improper range of the IQ inner product value are determined in correlation.

For example, an improper range of "−1000 to +1000" is determined for the signal strength in the range of "−140 dBm to −135 dBm". In contrast, for example, an IQ inner product value improper range of "−3000 to +3000" is determined for the signal strength in the range of "−146 dBm to −145 dBm". That is, the weaker the signal strength and the worse the reception state of the carrier waves, the wider the IQ inner product value improper range is determined.

In actual processes, the correlation computation between the received signal and the replica code is performed with respect to each of the I- and Q-signals. Moreover, the inner product (IQ inner product value) of the results of the correlation computation of the I- and Q-signals is obtained, and it is determined whether the IQ inner product value falls within the improper range. Moreover, when the IQ inner product value associated with the originating bit of the demodulation error falls within the improper range, the demodulation results are corrected by inverting the bit values of the bits subsequent to the originating bit.

Figure 12:
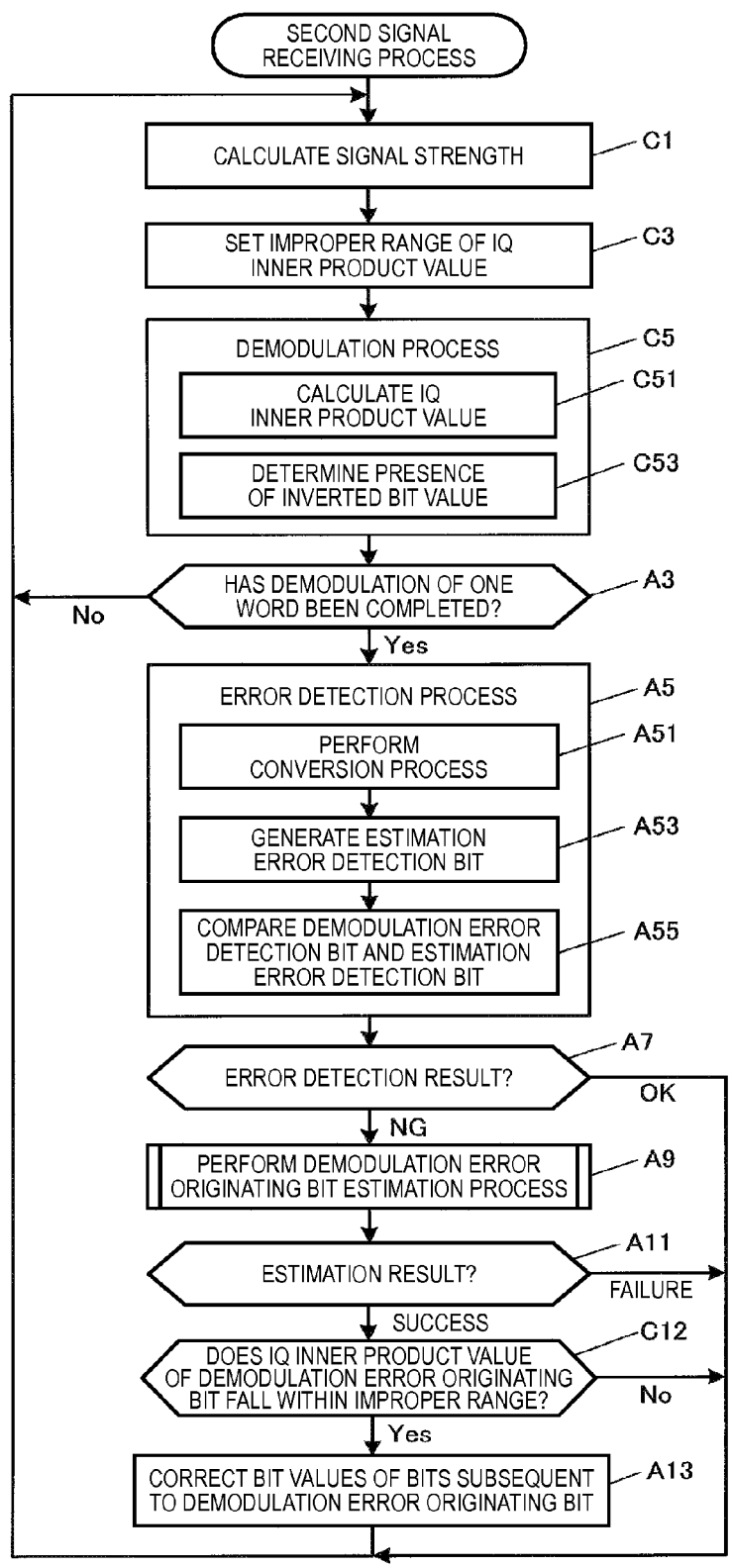
FIG. 12 is a flowchart showing the flow of a second signal receiving process.

FIG. 12 is a flowchart showing the flow of a second signal receiving process executed in the above case, in place of the signal receiving process of FIG. 9, by the processing unit 21 of the baseband processing circuit unit 20.

First, the satellite capturing unit 211 calculates the signal strength of the received signal of carrier waves (step C1). Moreover, the satellite capturing unit 211 sets the improper range of the IQ inner product value correlated with the signal strength calculated in step C1 by referring to the IQ inner product value improper range setting table shown in FIG. 11 (step C3).

Subsequently, the demodulation unit 213 performs a demodulation process (step C5). In the demodulation process, the demodulation unit 213 computes the IQ inner product value for respective bits according to Expression (2) (step C51). Moreover, the demodulation unit 213 determines whether the bit value of the navigation message has been changed or not based on the computed IQ inner product value (step C53).

After that, when it is determined in step A11 that the estimation result of the demodulation error originating bit is success (step A11: success), the satellite capturing unit 211 determines whether the IQ inner product value computed in step C51 for the demodulation error originating bit falls within the improper range of the IQ inner product value set in step C3 (step C12).

When it is determined that the IQ inner product value falls within the improper range (step C12: Yes), the correction unit 217 corrects the demodulation results by inverting the bit values of the bits subsequent to the demodulation error originating bit (step A13), and the flow returns to step C1. This corresponds to performing the correction by inverting the bit value of the bits subsequent to the originating bit when the value of the inner product associated with the originating bit of the demodulation error satisfies a predetermined condition.

When it is determined in step A7 that the error detection result is "OK" (step A7: OK), when it is determined in step A11 that the estimation result is "failure" (step A11: failure), or when it is determined in step C12 that the IQ inner product value does not fall within the improper range (the IQ inner product value is proper) (step C12: No), the satellite capturing unit 211 returns to step C1 without correcting the bit values.

In the above description, although the signal strength of the received signal has been described as an example of the reception state of carrier waves, the reception state is not limited to this. For example, a carrier wave reception environment such as a strong field environment, a moderate field environment, and a weak field environment may be used as the reception state, the predetermined condition of the IQ inner product value may be changed according to the reception environment.

3-2. Verification Word

In the above embodiment, the verification word "Hk" (k=1 to 24) has been defined for the 1st to 24th bits of the subject word. However, the verification word "Hk" (k=25 to 30) can be similarly defined for the 25th to 30th bits which are the error detection bits.

FIG. 13 is a verification word table showing verification words "Hk" associated with the error detection bits in a table format. In this verification word table, verification words "H25=0x3F", "H26(=0x1F)", "H27(=0x0F)", "H28(=0x07)", "H29(=0x03)" and "H30(=0x01)" are determined for the 25th to 30th bits, respectively. By using this verification word table, it is possible to estimate and correct the demodulation error originating bit even when the error detection bit becomes the originating bit of the demodulation error.

3-3. Error Detection Process

In the above embodiment, although an error detection method that uses the check code "Gk" has been described as an example, the error detection process is not limited to this. For example, as the error detection process, a process of performing parity checking based on even-odd parities using the 6-bit parity bits at the end of each word may be performed. Moreover, the parity checking based on the even-odd parities and the error detection that uses the check code "Gk" described in the above embodiment may be performed together.

3-4. Electronic Apparatus

In the above embodiment, although a case in which the invention is applied to a cellular phone which is one type of the electronic apparatus has been described as an example, an electronic apparatus to which the invention can be applied is not limited to this. For example, the invention can be similarly applied to other electronic apparatuses such as a car navigation device, a portable navigation device, a PC, a PDA (Personal Digital Assistant), and a wristwatch.

3-5. Subject of Process

In the above embodiment, processes such as demodulation of the received signal of carrier waves, the error detection process, generation of verification words, estimation of demodulation error originating bits, and correction of demodulation results are executed by the processing unit of the baseband processing circuit unit. However, a part or all of these processes may be executed by the host processor of the electronic apparatus.

For example, the processes may be distributed to the baseband processing circuit unit and the host processor in a manner that the demodulation of the received signal of the carrier waves and the error detection process are executed by the processing unit of the baseband processing circuit unit, and the generation of verification words, the estimation of the demodulation error originating bits, and the correction of the demodulation results are executed by the host processor of the electronic apparatus.

3-6. Satellite Positioning System

Moreover, in the above embodiment, although the GPS has been described as an example of the satellite positioning system, other satellite positioning systems such as WAAS (Wide Area Augmentation System), QZSS (Quasi-Zenith Satellite System), GLONASS (GLObal NAvigation Satellite System), or GALILEO may be used.

What is claimed is:

1. A signal receiving method comprising:
    receiving, as a received signal, a carrier wave of a navigation message that is modulated according to a BPSK (Binary Phase Shift Keying) modulation scheme;
    demodulating the received signal to generate a demodulation result;

performing an error detection process on the demodulation result using an error detection bit that is included in the demodulation result;

generating a verification word using the demodulation result and a check code when an error is detected by the error detection process, the check code being determined in advance for each bit of the navigation message based on a predetermined encoding rule;

estimating an originating bit of a demodulation error in a navigation message word of the navigation message based on the generated verification word and a predetermined verification word table; and correcting the demodulation result by inverting at least the bit values of all remaining bits of the navigation message word subsequent to the estimated originating bit.

2. The signal receiving method according to claim 1, wherein the generating of the verification word includes:

selecting the check code for each bit of the demodulation result according to the bit value of the bit;

generating an estimated bit value of the error detection bit from the selected check code; and generating the verification word from the estimated bit value and the bit value of the error detection bit included in the demodulation result.

3. The signal receiving method according to claim 1, wherein the verification word table stores verification word of each originating bit of the demodulation error, and the estimating includes retrieving a bit corresponding to the generated verification word from the verification word table.

4. The signal receiving method according to claim 1, further comprising:

performing correlation computation between the received signal and a replica code with respect to each of I-signal and Q-signal; and computing an inner product of the result of the correlation computation of the I-signal and the result of the correlation computation of the Q-signal, wherein the correcting includes performing the correcting by inverting at least the bit values of all remaining bits of the navigation message word subsequent to the originating bit when the value of the inner product associated with the originating bit satisfies a predetermined condition.

5. The signal receiving method according to claim 4, further comprising changing the predetermined condition according to a reception state of the carrier wave.

6. A receiver comprising:

a receiving unit that receives, as a received signal, a carrier wave of a navigation message that is modulated according to a BPSK modulation scheme;

a demodulation unit that demodulates the received signal to generate a demodulation result;

an error detection processing unit that performs an error detection process on the demodulation result using an error detection bit that is included in the demodulation result;

a verification word generator that generates a verification word using the demodulation result and a check code when an error is detected by the error detection process, the check code being determined in advance for each bit of the navigation message based on a predetermined encoding rule;

an estimation unit that estimates an originating bit of a demodulation error in a navigation message word of the navigation message based on the generated verification word and a predetermined verification word table; and a correction unit that corrects the demodulation result by inverting at least the bit values of all remaining bits of the navigation message word subsequent to the estimated originating bit.

* * * * *